United States Patent
Shome et al.

(10) Patent No.: US 10,300,634 B2
(45) Date of Patent: May 28, 2019

(54) ADVANCED MULTIPLE GRID HEAT SOURCES TO ACHIEVE OPTIMIZED CURE STRUCTURE AND METHOD OF MAKING THE SAME

(71) Applicant: The Boeing Company, Chicago, IL (US)

(72) Inventors: Moushumi Shome, Kent, WA (US); Aloke K. Pal, Kent, WA (US)

(73) Assignee: The Boeing Company, Chicago, IL (US)

( * ) Notice: Subject to any disclaimer, the term of this patent is extended or adjusted under 35 U.S.C. 154(b) by 606 days.

(21) Appl. No.: 14/941,998

(22) Filed: Nov. 16, 2015

(65) Prior Publication Data

US 2017/0136661 A1 May 18, 2017

(51) Int. Cl.
| | | |
|---|---|---|
| *B29C 35/02* | (2006.01) | |
| *F26B 23/06* | (2006.01) | |
| *F26B 3/18* | (2006.01) | |
| *F26B 3/30* | (2006.01) | |
| *B29C 70/54* | (2006.01) | |
| *B29C 70/34* | (2006.01) | |
| *B29C 73/34* | (2006.01) | |
| *B29K 105/08* | (2006.01) | |
| *B29K 307/04* | (2006.01) | |

(52) U.S. Cl.
CPC ...... *B29C 35/0294* (2013.01); *B29C 35/0266* (2013.01); *B29C 35/0288* (2013.01); *B29C 70/342* (2013.01); *B29C 70/54* (2013.01); *B29C 73/34* (2013.01); *F26B 3/18* (2013.01); *F26B 3/30* (2013.01); *F26B 23/06* (2013.01); *B29K 2105/0872* (2013.01); *B29K 2307/04* (2013.01)

(58) Field of Classification Search
CPC . B29C 35/0294; B29C 35/0288; B29C 73/34; B29C 70/342; B29C 35/0266; B29C 70/54; F26B 23/06; F26B 3/18; F26B 3/30; B29K 2105/0872; B29K 2307/04
See application file for complete search history.

(56) References Cited

U.S. PATENT DOCUMENTS

| | | | |
|---|---|---|---|
| 4,828,472 | A | 5/1989 | Itoh et al. |
| 5,209,881 | A | 5/1993 | Charbonnet |
| 2009/0011063 | A1 | 1/2009 | Davie et al. |
| 2015/0306712 | A1 | 10/2015 | Devasia et al. |

FOREIGN PATENT DOCUMENTS

| | | |
|---|---|---|
| CA | 2 879 292 A1 | 11/2015 |
| WO | 2015071844 A1 | 5/2015 |

OTHER PUBLICATIONS

"Out of Autoclave Tooling"; Weber Manufacturing Technologies Inc.; http://www.webermfg.ca/presentations.shtml.

*Primary Examiner* — Robert J Grun (74) *Attorney, Agent, or Firm* — Felix L. Fischer (57) ABSTRACT

A composite structure curing system employs a plurality of heaters mounted in at least one array in spaced proximity to a composite structure to be cured. A plurality of temperature sensors are mounted to sense temperature at selected locations on the structure. A control system receives an input from each of the plurality of temperature sensors and is adapted to control each of the plurality of heaters responsive to each input to establish a predetermined temperature profile on the structure during cure.

21 Claims, 13 Drawing Sheets

ADVANCED MULTIPLE GRID HEAT SOURCES TO ACHIEVE OPTIMIZED CURE STRUCTURE AND METHOD OF MAKING THE SAME

BACKGROUND INFORMATION

Field

Embodiments of the disclosure relate generally to the field of curing of composite structures and more particularly to a method and system employing an array of heaters controlled responsive to temperature sensors mounted at selected locations on the structure to establish a desired temperature profile on the structure during cure.

BACKGROUND

Maintaining part quality and program critical rate requirements while manufacturing composite structures such as wing, fuselage, control surface skin panels is an ongoing challenge as the structures become more complex. Autoclave curing which is typically employed may not provide uniform temperature profiles on a non-uniform composite structure and in certain cases may not vary temperature profiles as needed for factory or field repairs. Consequently, varied composite cross section profiles may accumulate heat at different rates when subjected to substantially the same heating profile. The manufacturing process therefore may not be efficient in flow time and may result in issues such as burned parts or less than desired part curing. Curing process efficiency may also be affected and overheating in different locations of curing panels, due to varying temperature profile, may result in some parts of a panel reaching too high a temperature for too long potentially making that region reach a less than desired cure.

Products like aircraft, spacecraft, naval vessels and automobiles, contain hundreds of separate panels or other structural elements. Forming these parts is a long process with many steps including layup of the plies and vacuum bagging, inserting the vacuum bagged part in the autoclave and curing, in which temperature increases to cure temperature (~300 deg F.) and stays constant for 3 hours and then gradually decreases. In exemplary processes a total cure cycle may be approximately 5 hours. The temperature profile may change at different locations of the panel inside the autoclave since heat enters corners and edges of a composite structural panel faster than the center of the panel and due to variations in the structure from one end of the of the panel to the other end. Variations in the panel being cured may not be limited to varying numbers of plies and/or thickness, core configurations and configuration of the supporting structure. Further, in most processes a constant pressure of about 95 psi is maintained inside the autoclave. Additionally, installation and removal of a caul plate is used for panels such as, but not limited to skin panels with stringers to make sure the stiffness is maintained that is needed to stabilize the structure. For other structures, other types of stiffeners are used for stabilizing the structure during curing. Each of these steps may be subject to error leading to less than desired results.

The heating of the part being cured is achieved by re-circulating hot air in the autoclave with the flow of air from a forward (door) end to an aft end of the oven. The composite part heating takes place via conduction through the caul sheet and through the tool face sheet. Heating of the caul plate and tool face sheet is predominantly via convection. The airflow profile, therefore, is expected to have significant impact on the heat transfer to the part. Airflow modeling of autoclave processing indicates that the air flows predominantly through the center and shifts upwards downstream. Given the differences in airflow and the skin gages around a part, the temperatures and heating/cooling rates tend to differ from top to bottom and from front to back on the barrel. In addition, some locations are leading (follow the air temperature very closely) and other locations are lagging (lag the air temperature). In general, thinner parts and tools exposed to direct airflow tend to be leading, and thicker parts and tools away from the airflow tend to be lagging.

In most prior art processes, many of these steps are performed by a human technician. This labor intensive process is costly.

It is therefore desirable to provide a method and system to ensure uniform curing of composite structures with the ability to identify the leading and the lagging areas along with their temperatures and their heating and cooling rates. It is also desirable to reduce cost through automation.

SUMMARY

Embodiments disclosed herein provide a composite structure curing system employing a plurality of heaters mounted in at least one array in spaced proximity to a composite structure to be cured. A plurality of temperature sensors are mounted to sense temperature at selected locations on the structure. A control system receives an input from each of the plurality of temperature sensors and is adapted to control each of the plurality of heaters responsive to each input to establish a predetermined temperature profile on the structure during cure.

The embodiments allow a method for controlling cure temperature of a composite structure wherein heat is applied from a plurality of heaters. The applied heat is sensed at a plurality of locations on a non-uniform composite structure and power to each of the plurality of heaters is controlled responsive to a plurality of temperature sensors.

The features, functions, and advantages that have been discussed can be achieved independently in various embodiments of the present disclosure or may be combined in yet other embodiments, further details of which can be seen with reference to the following description and drawings.

DETAILED DESCRIPTION

Embodiments disclosed herein provide a system that incorporates multiple heat sources arranged in one or more arrays to control temperature of a composite structure that can vary at different locations of the structure. The composite structure may be, for example, a fiber reinforced composite skin panel or similar structure. The requirements for temperature control may be due to a non-uniform configuration of the structure or environmental considerations in a uniform structure. A control system monitors temperature sensors, which are dispersed on or in the composite structure.

The control system may employ a feedback loop to increase or decrease heat provided by each of the heat sources to control cure temperature of the composite structure at different locations which require varied temperatures during cure. This system has multiple applications; it may be employed for manufacturing of certain composite panels; it could be implemented for repair of structures where the repair region needs different cure temperature and the surrounding structure will be at different temperature, and it could be used for hybrid structures containing SMA or "smart fibers" where morphing of smart fibers could be controlled with the arrayed heat sources. (The benefit of multiple heat sources is the smart fibers could be cured according to the structural need at different positions with different temperatures.)

Figure 1A:
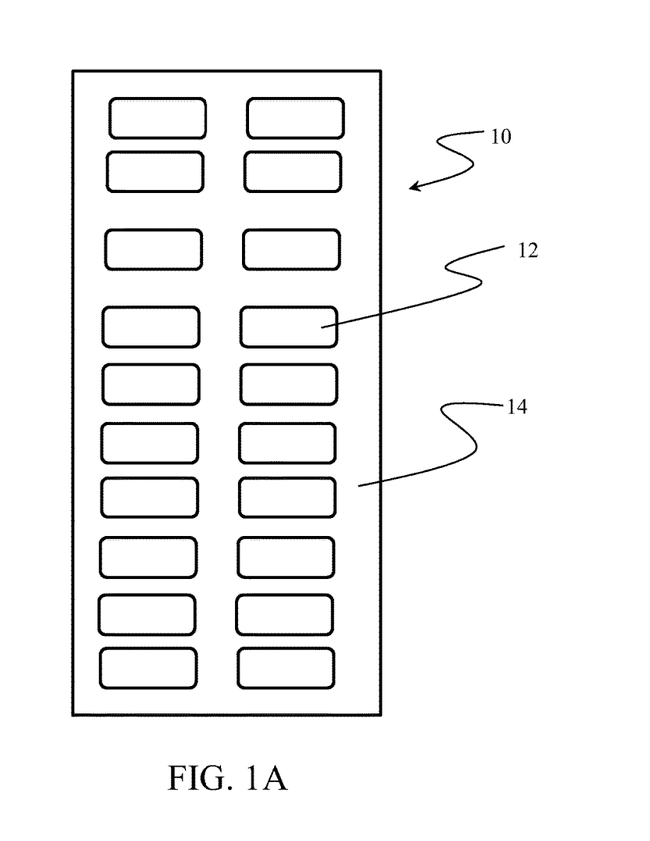
FIG. 1A is a top depiction of an exemplary heater array for use with an embodiment.
Figure 1B:
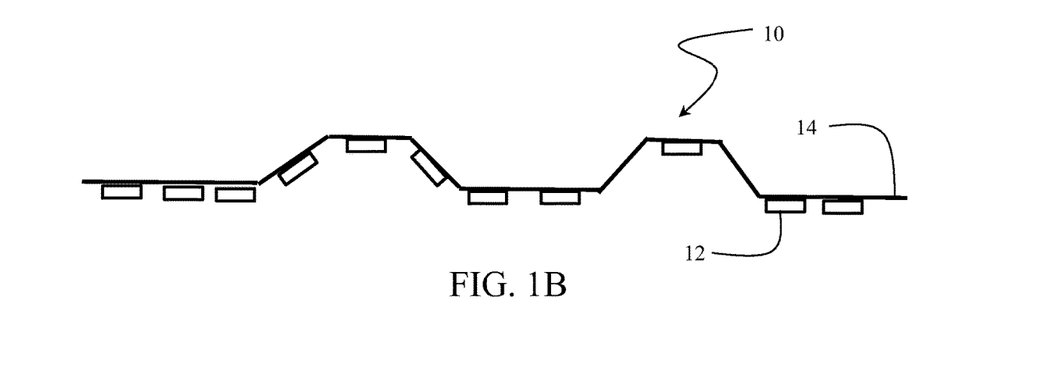
FIG. 1B is a side depiction of the exemplary heater array demonstrating the three dimensional characteristics of the array.

Referring to the drawings, FIGS. 1A and 1B show an example of a heat board 10, shown from above or below in FIG. 1A and from the side in FIG. 1B, having a plurality of heat sources 12 arranged in an array on a substrate 14. The substrate 14 may be rigid to be self-supporting adjacent a structure to be cured or flexible, as in a heat blanket, to be applied on the surface of the structure. The heat sources may be resistance heaters, infrared radiant heaters or microwave heaters (which may employ susceptors) as examples. The heat sources may be connected in series or parallel for individual or multiple control for heat output. For the example shown, the array has non-uniform spacing which may be created based on requirements for a specific structure or part to be cured. Arrays with uniform spacing may be employed as a generalized case.

Figure 2:
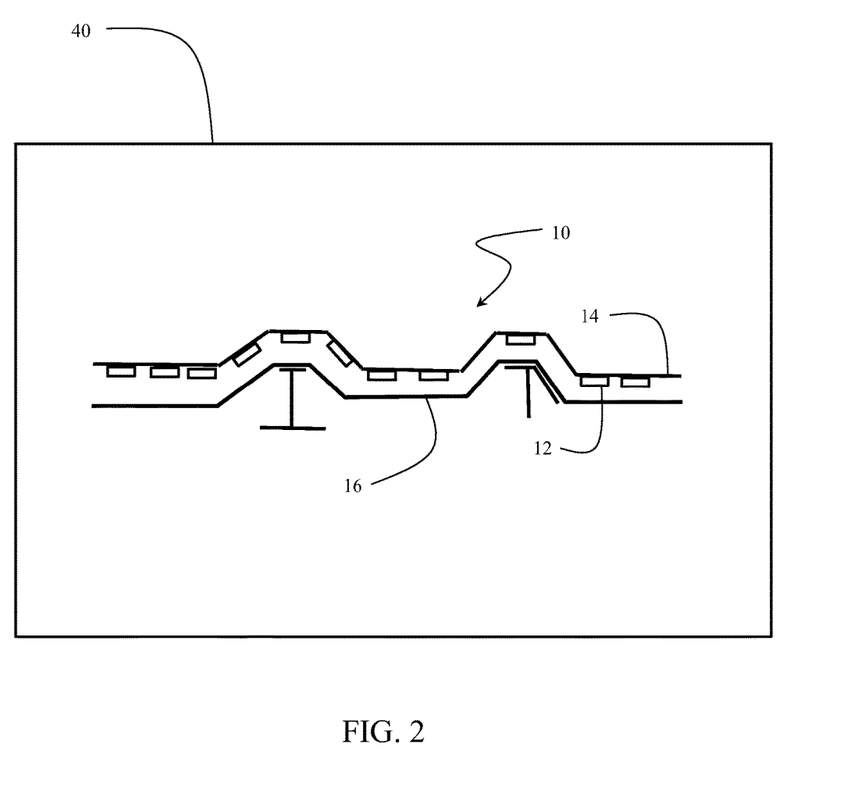
FIG. 2 is a side depiction of an exemplary heater array within a pressure chamber demonstrating the three dimensional characteristics of the array.

FIG. 2 shows a side view of the heat board 10 disposed within a pressure chamber 40. The profile of the substrate 14 (as previously shown and described with respect to FIG. 1B) may be flat or three dimensional and adapted for placing the heat board 10 closely adjacent to a non-uniform composite structure 16 that has a compatible shape. Maintaining a constant spacing of the heat board 10 from the structure 16 enhances control of heat transfer for curing the structure. Use of a pressure chamber 40 allows pressure to be applied to the structure being cured during the cure cycle and will be described in greater detail subsequently.

Figure 3A:
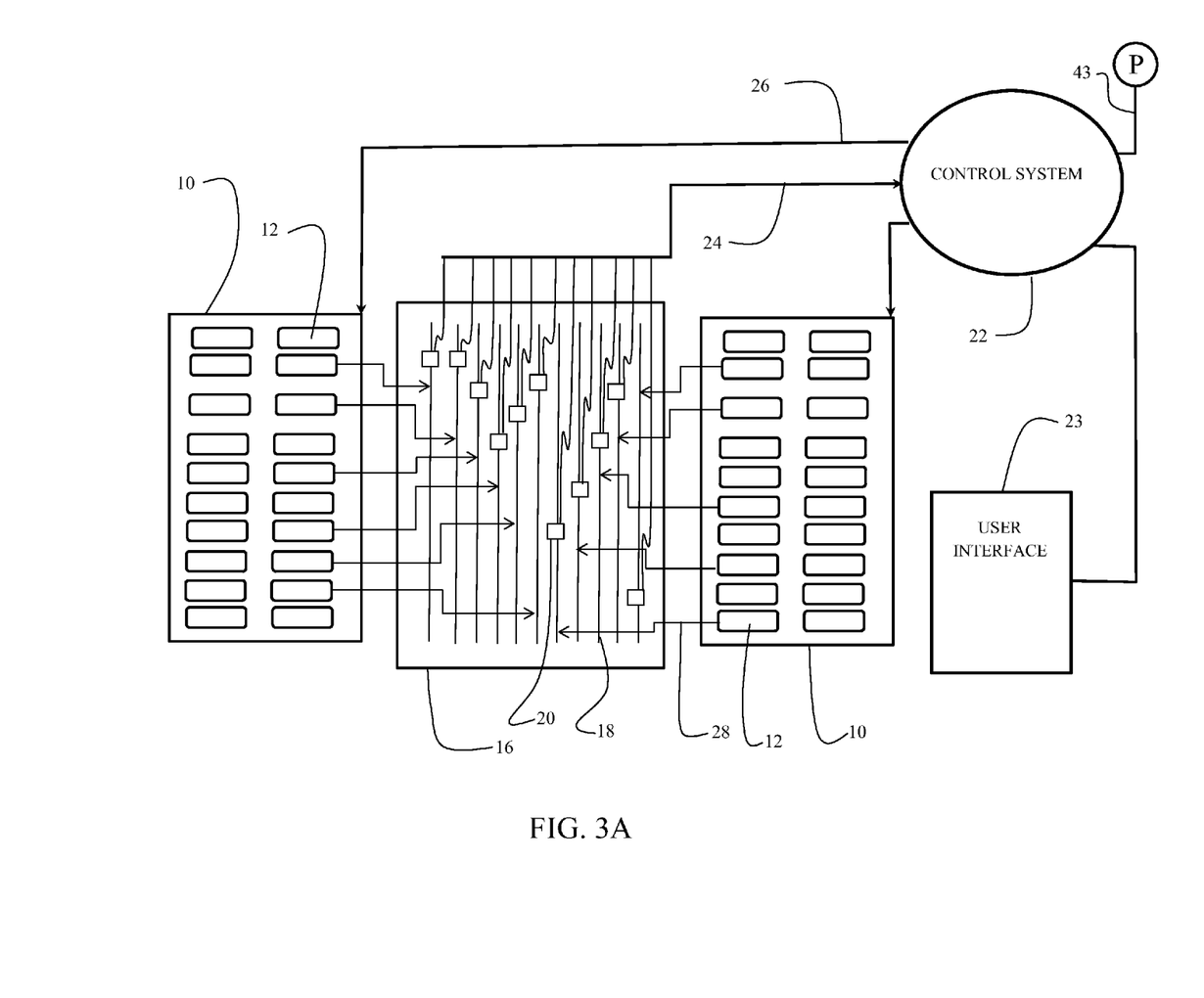
FIG. 3A is a schematic representation of a composite panel with embedded fibers and a relationship between fibers and heater elements in the array with a control system monitoring temperature sensors for control of the individual heater elements in the array.

FIG. 3A schematically represents an exemplary composite structure 16 having multiple fibers 18. In actual embodiments, the composite structure 16 may have multiple plies of carbon fiber reinforced plastic (CFRP) and may employ thermoset and thermoplastic resins or other composite materials and may incorporate metal fibers or SMA fibers within the plies in addition to structural fibers, as will be described in greater detail subsequently. Two heater boards 10 with associated arrays of heat sources 12 are arranged adjacent the composite structure 16. A plurality of temperature sensors 20 is associated with the composite structure 16. The sensors may be placed on the structure or integrated within the structure. Each of the temperature sensors 20 is connected to a control system 22 with appropriate signal inputs 24. The control system 22 is connected through appropriate control outputs 26 to the heat sources 12 on the heater boards 10. Each of the temperature sensors 20 provides temperature of one fiber 18 or area of the composite structure. The control system provides an output to the individual heat sources 12 in the heater boards 10 for control of heat applied to each individual fiber 18 or area as represented by arrows 28 The specific representation in FIG. 3A of heat sources 12 and fibers 18 as well as the position and number of temperature sensors 20 and their location is merely a notional depiction to demonstrate the association of elements in the system and actual numbers and relationships will vary depending on the requirements of the composite structure 16 being cured. For example multiple heat sources may be associated with a single fiber 18 (for instance along the length of a fiber) or one heat source may be associated with multiple fibers. One temperature sensor 20 may be associated with multiple fibers 18 and provide input for control of multiple heat sources 12.

After completion of the cure cycle for the composite structure 16 (or periodically during the cure cycle), the control system 22 delivers an output to a user interface 23. The user interface may be integral with the control system 22 or at a remote location. In a typical embodiment, the output provided to the user interface 23 is a data structure providing a binary (yes/no) output to indicate whether the surface meets requirements (the cure cycle remained within tolerance). In some embodiments a record of the way or ways in which a surface failed to meet requirements such as temperature excursions beyond desired range may be provided as the output. The output may additionally provide information in a time sequence for all temperature sensors 20 and heat sources 12. Details of the output vary with the application and may be adjusted in accordance with user preferences.

Figure 3B:
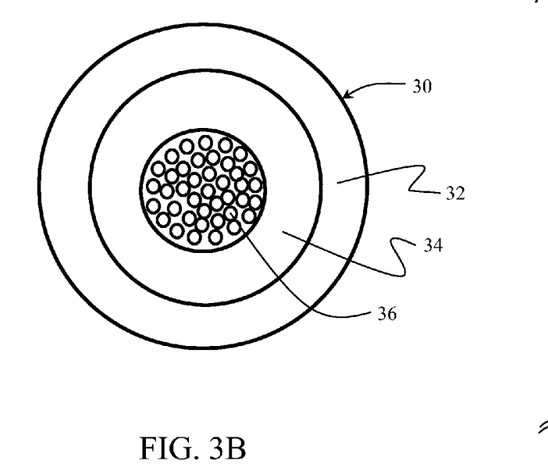
FIG. 3B is a cross section of an exemplary shape memory alloy (SMA) fiber for use in the composite panel in which conductors within the fiber may be employed for transmission of signals from temperature sensors.
Figure 3C:
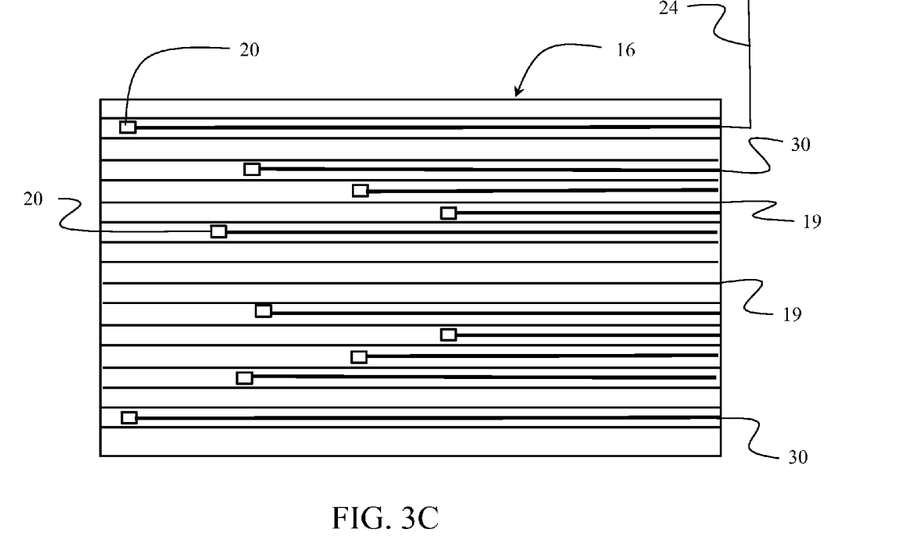
FIG. 3C is a top depiction of a composite structure with SMA fibers interspersed with structural fibers.

The composite structure 16 may include SMA fibers as a portion of the fibers 18. SMA fibers in a composite structure such as a panel may be employed as "smart fibers" to alter the shape of the panel based on temperature or other activation. As seen in FIG. 3B a SMA fiber 30 may employ an outer layer 32 of SMA material, a concentric insulation layer 34 and one or more conductors 36—integrated within the fiber. As seen in FIG. 3C, a plurality of SMA fibers 30 may be interspersed with carbon fibers 19 (or other structural fibers) in the composite structure 16. In curing of the composite structure 16 as described above, control of the array of heat sources 12 by the control system 22 may be accomplished to cause selective heating with respect to one or more of the SMA fibers 30 to cause the fiber to deflect or change shape during the cure. This "morphing" of shape may additionally benefit curing of the composite structure by adjusting shape of the panel during the cure cycle. Additionally, the integral conductors 36 (seen in FIG. 3B) may be employed for electrical connection of the temperature sensors 20 mounted in or on the composite structure 16—to the control system 22 through the signal input 24 (shown as exemplary for one SMA fiber).

Figure 4A:
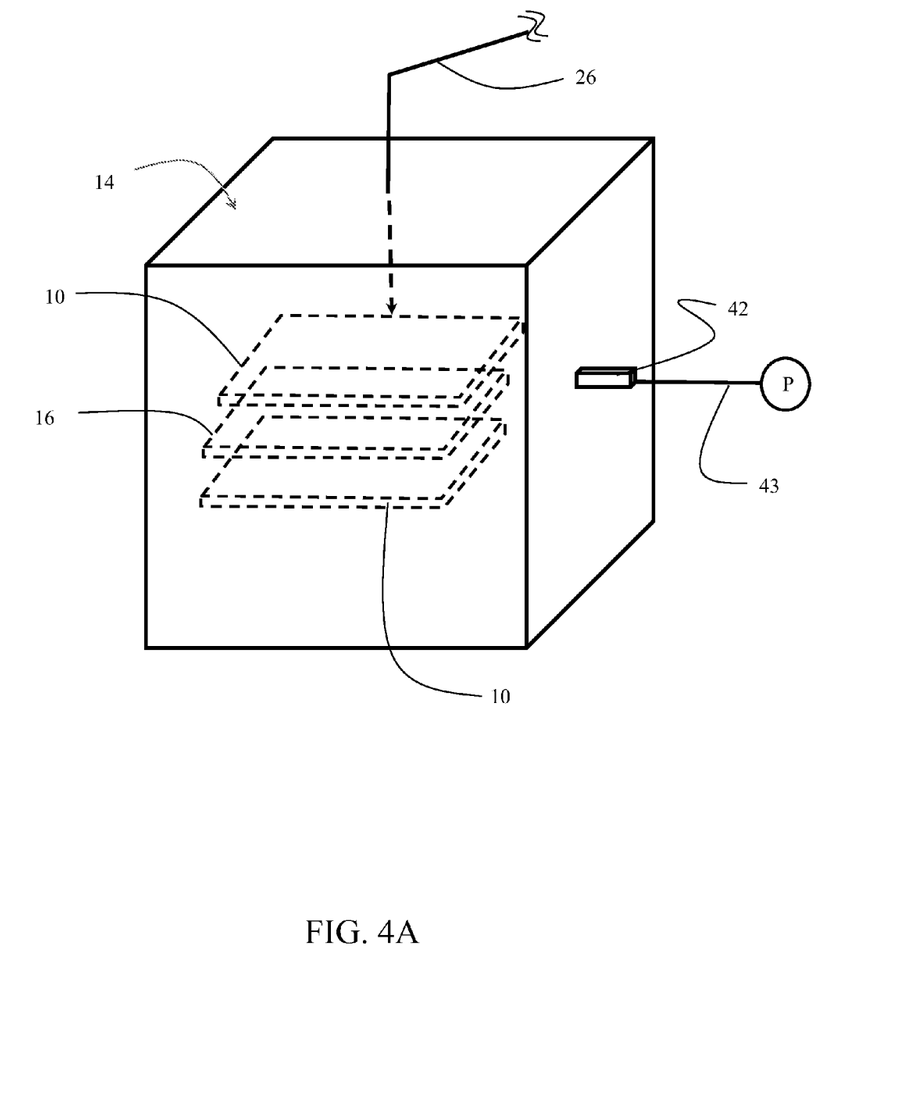
FIG. 4A is a depiction of a first exemplary configuration of a pressure chamber with a pressure control valve.

Curing of the composite structure 16 may also employ a pressure chamber to facilitate or enhance the cure. As seen in FIG. 4A a pressure chamber 40 receives the composite structure 16 with the heater boards 10 mounted in the chamber. A single controllable pressure valve 42 may be employed for controlling pressure in the chamber by introducing pressurized air or inert gas, as may be required by the curing process. The controllable pressure valve 42 may be a combined inlet and outlet valve or separate valves may be employed for inlet and outlet and may be positioned on the pressure chamber 40 at opposing locations or at locations to facilitate a particular flow path over the composite structure 16 as inserted in the chamber 40. The controllable pressure valve 42 may be connected to the control system 22 (as indicated by connection 43 in FIGS. 3A and 4A) for coordinated control of a predetermined pressure profile in the chamber 40 during the operation of the heat boards 10 in the cure cycle.

Figure 4B:
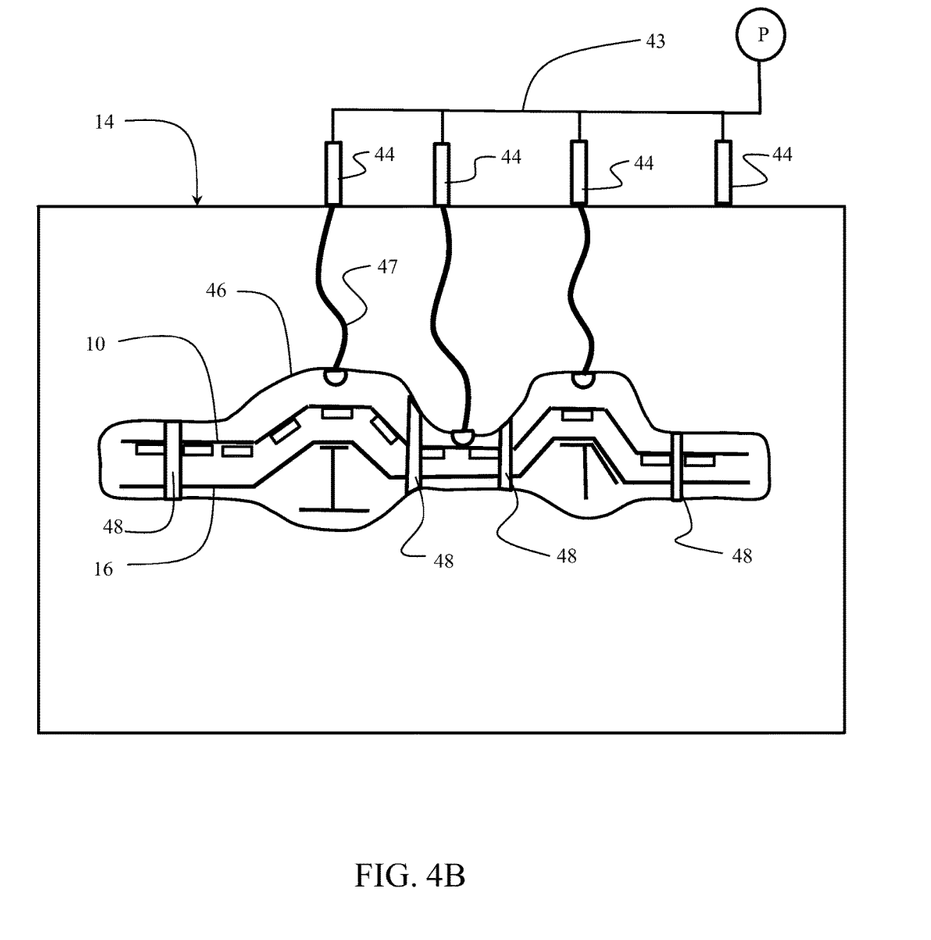
FIG. 4B is a depiction of a second exemplary configuration of a pressure chamber with multiple control valves.

Alternatively, a plurality of controllable pressure valves 44 may be positioned in one or more arrays for inlet or outlet of pressurized gas from the pressure chamber 40 to establish desired pressure on various portions of the composite structure 16 which is sealed with bagging 46 with internal pressure seals 48 segregating portions of the composite structure 16 within the chamber as shown in FIG. 4B. In certain embodiments, the bagging 46 may be sufficient to act as the pressure chamber and a secondary hard structure pressure chamber may not be required. Pressure within the chamber 40 external to the bagging 46 may also be controlled by one of the pressure control valves 44. As with the single controllable pressure valve 42 as described with respect to FIG. 4A, the control system 22 may be connected for control of the controllable pressure valves 44 (as indicated by connection 43 in FIGS. 3A and 4B). The controllable pressure valves 44 may be connected directly to the bagging 46 or may be connected with routed tubing and ports 47. Pressure sensors may be employed to provide pressure data to the control system 22 for control of the plurality of pressure control valves.

Figure 4C:
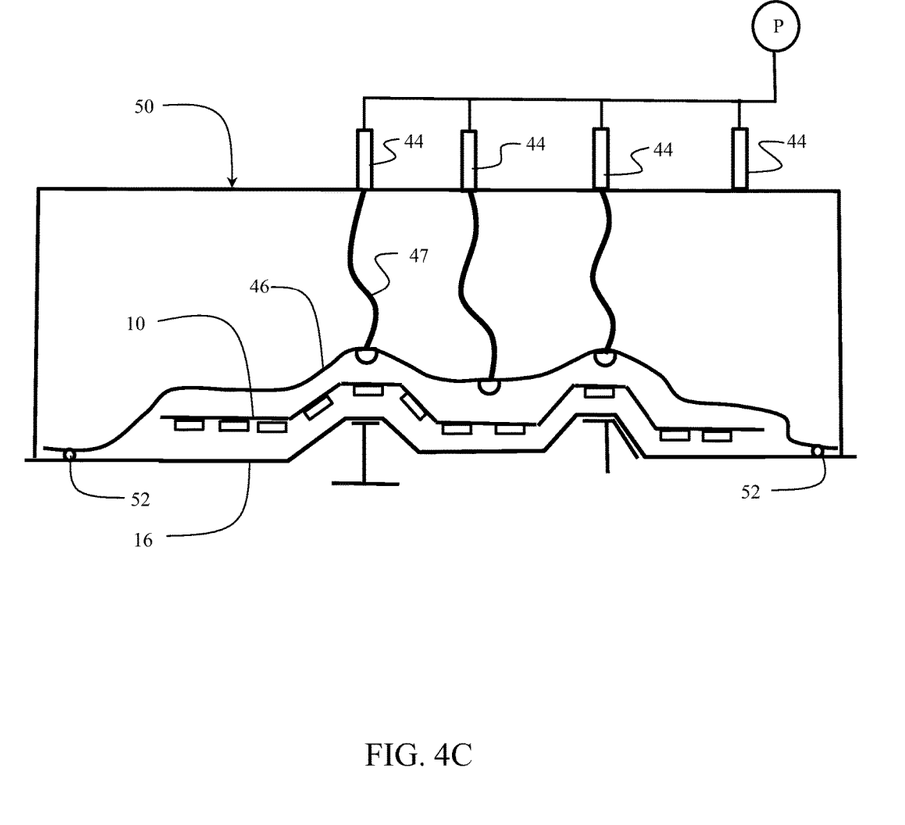
FIG. 4C is a depiction of an exemplary configuration of the pressure chamber for repairs.

For repair procedures, the bagging 46 may be employed to seal the composite structure 16 in situ with a seal 52 around the periphery, with or without an accompanying pressure cover 50 as seen in FIG. 4C. While described with respect to FIGS. 4A, 4B and 4C herein as a positive pressure, the pressure applied may be a vacuum (net negative pressure) in certain embodiments.

The embodiments disclosed allow a method for controlling cure temperature of a composite wherein heat is applied from a plurality of heaters in one or more phases of a cure cycle as shown in FIGS. 5A-5D. Applied heat is sensed at a plurality of locations on a composite structure and power to each of the plurality of heaters is controlled responsive to a plurality of temperature sensors.

Figure 5A:
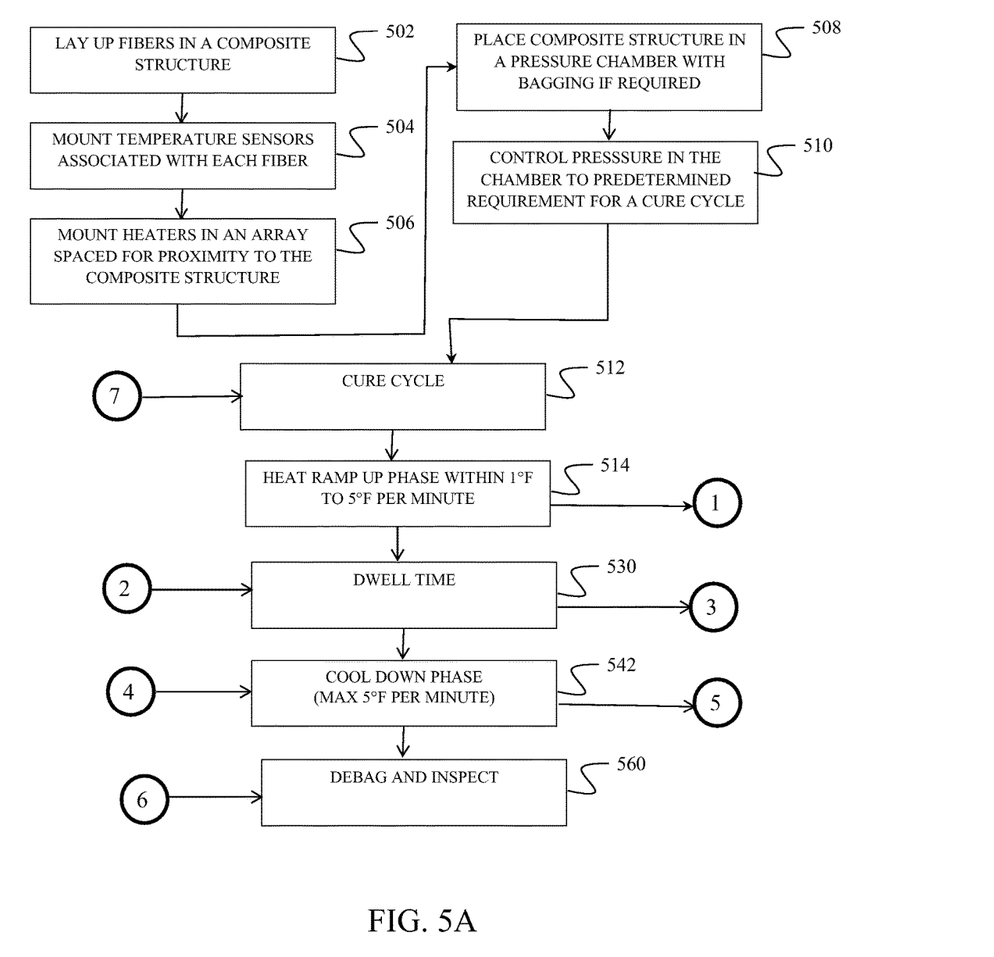
FIGS. 5A-5E are a flow chart of a method of operation of the embodiments for control of the heater array.
Figure 5B:
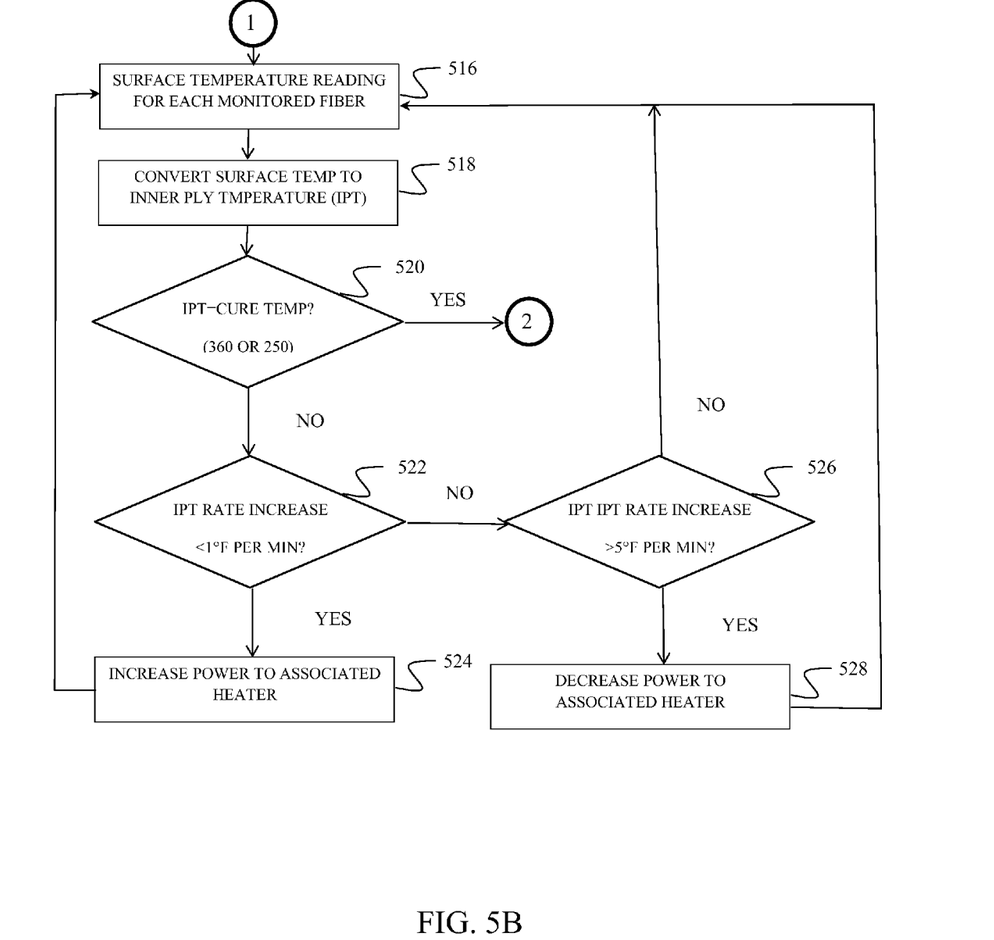
Figure 5C:
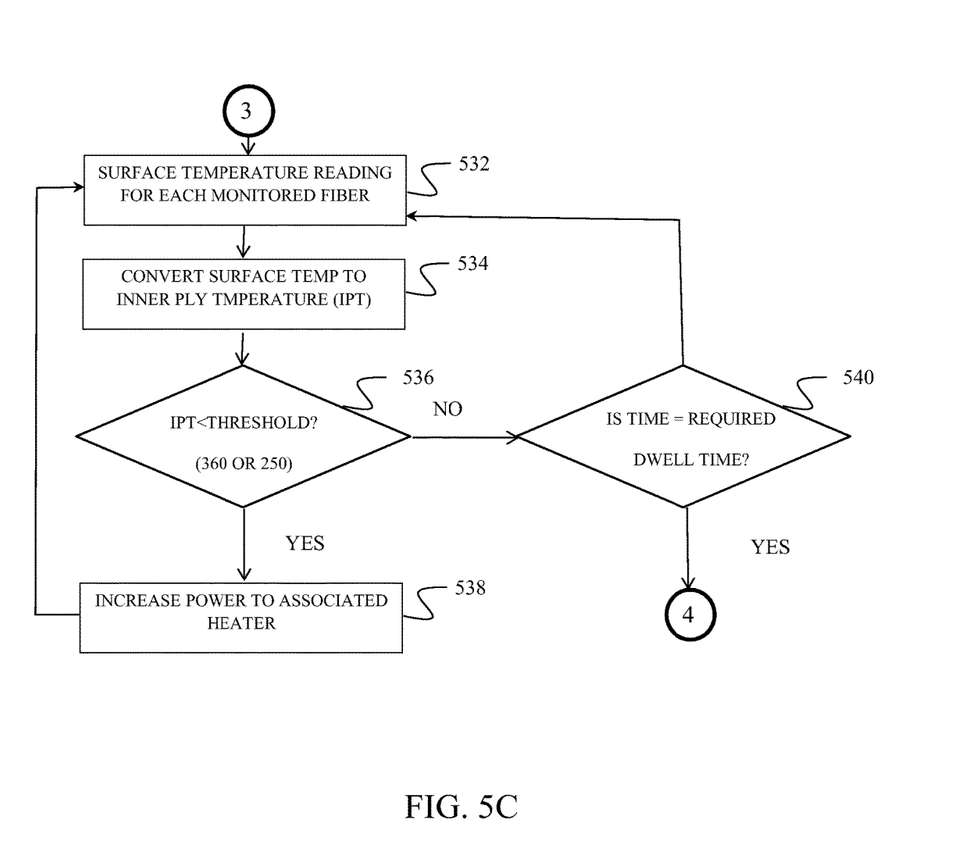
Figure 5D:
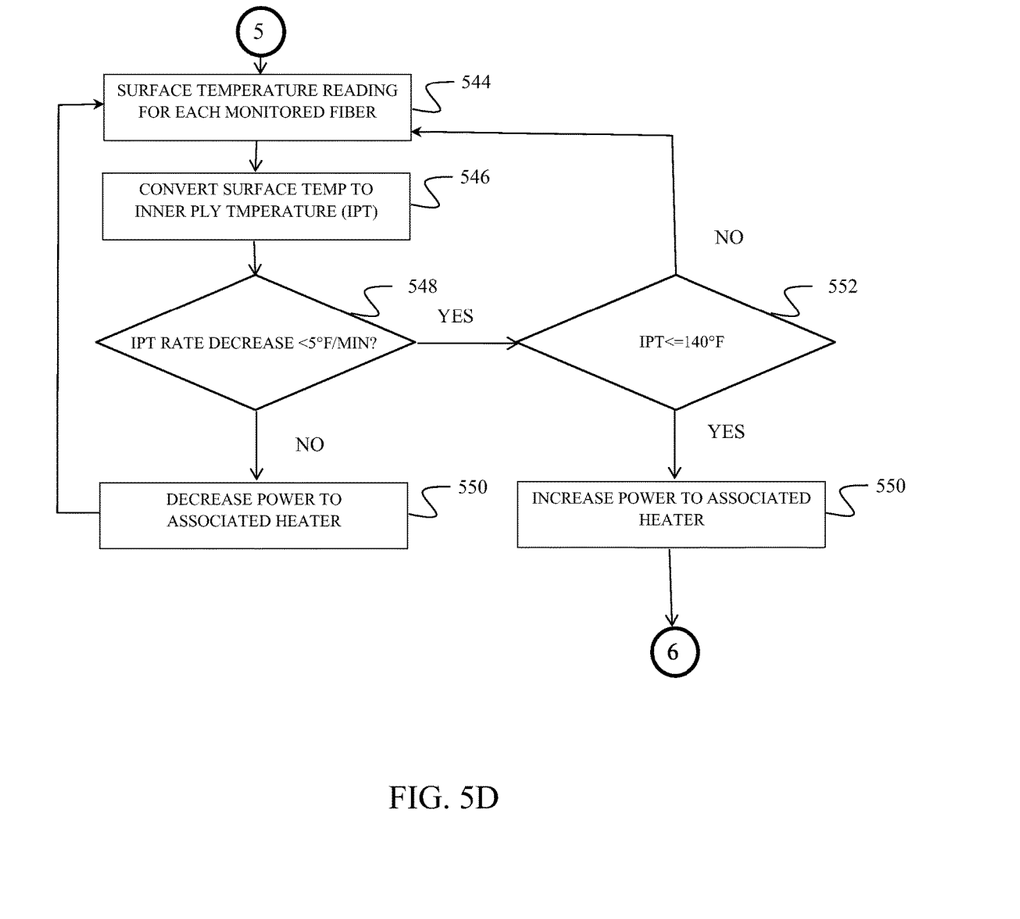

As seen in FIG. 5A, a plurality of placed fibers is laid up in the composite structure, step 502. The composite structure requiring use of the embodiments disclosed herein is typically non-uniform. However, the embodiments may be employed with uniform structures where environmental conditions or other requirements suggest use of the controllable heating provided by the disclosed system and method. The plurality of placed fibers may include shape memory alloy fibers and the temperature sensors may be connected to a controller through conductive elements in an associated shape memory alloy fiber. A plurality of temperature sensors is mounted to the composite structure, each sensor associated with one of the placed fibers, step 504. In structures employing SMA fibers, the temperatures sensors may be associated with the SMA fibers as previously described. A plurality of heaters is mounted in at least one array having predetermined spacing for proximity to the non-uniform composite structure, step 506. In exemplary embodiments the heaters may be resistive heaters, infrared radiant heaters or microwave heaters employing klystrons for power (susceptors may also be employed). The non-uniform composite structure is placed in a pressure chamber, step 508, and the pressure is controlled in the chamber 40 responsive to predetermined requirements for the cure cycle on the non-uniform composite structure 16, step 510. The pressure chamber 40 may incorporate at least one controllable pressure valve 42 or a plurality of controllable pressure valves 44 and controlling pressure within step 510 may be accomplished by controlling each of the plurality of controllable pressure valves 44 responsive to a predetermined profile. As previously described with respect to FIG. 4B, bagging 46 may be incorporated surrounding the composite structure 16 within the pressure chamber 40 or may act as the pressure chamber without the need for a hard structure pressure chamber.

A cure cycle, generally designated 512, is then accomplished by initiating temperature ramp up for cure, step 514. A temperature reading is determined from each of the plurality of temperature sensors, step 516. If applicable, a surface temperature reading may be converted to an inner ply temperature by calculation in the control system to provide an inner ply temperature profile, step 518. A determination is made if a temperature threshold has been reached for each of the plurality of temperature sensors, step 520.

If not, power is maintained to each heater associated with each of the plurality of temperature sensors for which the temperature threshold has not been reached and calculations are made to determine if power to the heater is resulting in a temperature increase of less than 1° F. per minute, step 522. If so, power is increased to the heater, step 524. If not, a calculation is made to determine if the power to the heater is resulting in a temperature increase of greater than 5° F. per minute, step 526. If so, power is then reduced to the heater, step 528. When the threshold temperature has been reached, a dwell cycle is entered, step 530. During the dwell cycle, a temperature reading from each of the plurality of temperature sensors 20 is determined, step 532. If applicable, a surface temperature reading may be converted to a inner ply temperature by calculation in the control system, step 534. A determination is made if a temperature threshold is being maintained for each of the plurality of temperature sensors, step 536, and, power is increased to a heater associated with each of the plurality of temperature sensors for which the temperature threshold has not been maintained, step 538. When the dwell time has expired, step 540, a cool down phase is entered, step 542.

A temperature ramp down is initiated and a temperature reading from each of the plurality of temperature sensors is determined, step 544. If applicable, a surface temperature reading may be converted to an inner ply temperature by calculation in the control system, step 546. A determination is made if a temperature decrease rate has been reached for each of the plurality of temperature sensors, step 548 and power is decreased to the heater associated with each of the plurality of temperature sensors for which the temperature decrease rate has not been reached, step 550. A determination is made if a temperature cutoff has been reached for each of the plurality of temperature sensors, step 552 and, if so, power is turned off to the heater associated with each of the plurality of temperature sensors for which the temperature cutoff has been reached, step 554. The composite structure may then be debagged and inspected, step 560.

Figure 5E:
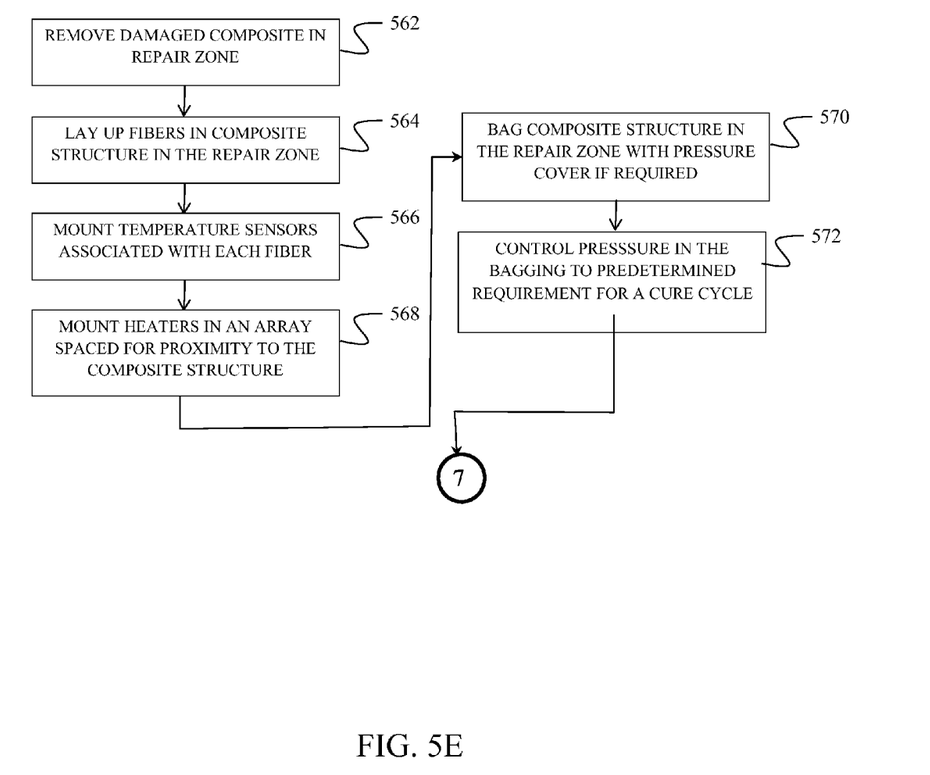

The operational steps provided by the method described may also specifically be applied for repair procedures as shown in FIG. 5E. For repair of a composite panel, for example a wing skin, the damaged panel portion may be removed from a repair zone, step 562, and replacement composite materials having structural fibers laid up in the repair zone, step 564. In alternative embodiments layup may be accomplished with composite plies incorporating the fibers. A plurality of temperature sensors is mounted to the composite structure, each sensor associated with one of the placed fibers, step 566. A plurality of heaters is mounted in at least one array having predetermined spacing for proximity to the composite structure in the repair zone, step 568. In exemplary embodiments the heaters may be resistive heaters, infrared radiant heaters or microwave heaters employing klystrons for power (susceptors may also be employed). The composite structure in the repair zone is bagged with a peripheral seal and, in certain procedures, a pressure cover may be installed over the repair zone, step 570. The pressure is controlled in the bagging 46 and/or pressure cover 50 (as described with respect to FIG. 4C) responsive to predetermined requirements for the cure cycle on the repaired composite structure 16, step 572. The bagging 46 and/or pressure cover 50 may incorporate a plurality of controllable pressure valves 44 and controlling pressure within step 572 may be accomplished by controlling each of the plurality of controllable pressure valves 44 responsive to a predetermined profile. A cure cycle, generally designated 512, is then accomplished as previously described.

Figure 6:
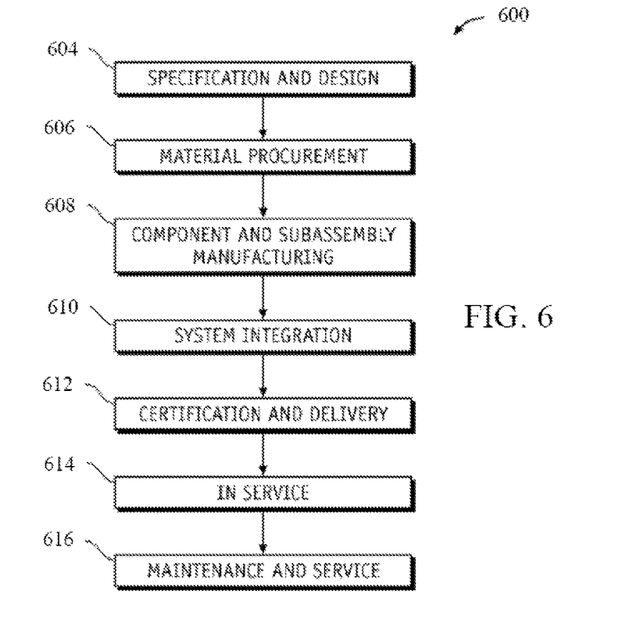
FIG. 6 is a flow chart depicting an aircraft manufacturing and service method in which the disclosed embodiments may be employed; and, FIG. 7 is a flow chart depicting an aircraft with which the disclosed embodiments may be employed.
Figure 7:
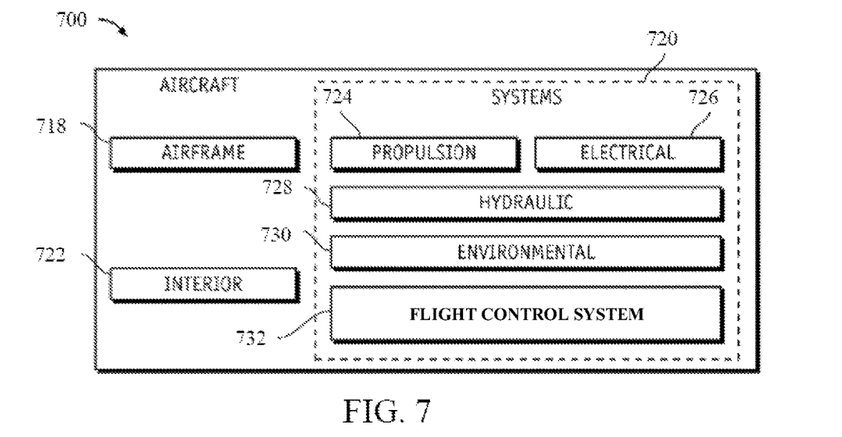

Embodiments of the disclosure may be described in the context of an aircraft manufacturing and service method 600 (method 600) as shown in FIG. 6 and an aircraft 700 as shown in FIG. 7. During pre-production, the exemplary method 600 may include specification and design 604 of the aircraft 700 and material procurement 606. During production, component and subassembly manufacturing 608 and system integration 610 of the aircraft 700 takes place. Thereafter, the aircraft 700 may go through certification and delivery 612 in order to be placed in service 614. While in service by a customer, the aircraft 700 is scheduled for routine maintenance and service 616 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 7, the aircraft 700 produced by the exemplary method 600 may include an airframe 718 with a plurality of systems 720 and an interior 722. Examples of high-level systems 720 include one or more of a propulsion system 724, an electrical system 726, a hydraulic system 728, an environmental system 730, and flight control system 732. Any number of other systems may also be included. Although an aerospace example is shown, the embodiments of the disclosure may be applied to other industries.

Apparatus and methods embodied herein and previously described may be employed during any one or more of the stages of the production and service method 600. For example, components or subassemblies corresponding to production process 608 may be fabricated or manufactured in a manner similar to components or subassemblies produced while the aircraft 700 is in service. In addition, one or more apparatus embodiments, method embodiments, or a combination thereof may be utilized during the production stages 608 and 610, for example, by substantially expediting assembly of or reducing the cost of an aircraft 700. Similarly, one or more of apparatus embodiments, method embodiments, or a combination thereof may be utilized while the aircraft 700 is in service, for example and without limitation, to maintenance and service 616.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A composite structure curing system comprising:
 a plurality of heaters mounted in at least one array in spaced proximity to a composite structure to be cured;
 a plurality of temperature sensors mounted to sense temperature at selected locations on the structure; and,
 a control system receiving an input from each of the plurality of temperature sensors, said control system adapted to control each of the plurality of heaters responsive to each input to establish a predetermined temperature profile on the structure during cure, wherein the composite structure incorporates a plurality of placed fibers and at least one of said plurality of temperature sensors is associated with each of the plurality of placed fibers to sense temperature of each placed fiber.

2. The composite structure curing system as defined in claim 1 further comprising:
 a pressure chamber receiving the composite structure and having at least one controllable pressure valve;
 said control system further adapted to control said at least one controllable pressure valve to establish a predetermined pressure profile on the structure during cure.

3. The composite structure curing system as defined in claim 2 wherein the plurality of heaters are mounted within the pressure chamber.

4. The composite structure curing system as defined in claim 2 further comprising a bagging surrounding the composite structure in the pressure chamber and a plurality of seals with the bagging and said at least one controllable pressure valve comprise a plurality of controllable pressure valves associated with said plurality of seals.

5. The composite structure curing system as defined in claim 1 wherein the plurality of heaters are resistive heaters, infrared radiant heaters or microwave klystrons.

6. The composite structure curing system as defined in claim 1 wherein the plurality of placed fibers comprises shape memory alloy fibers or structural fibers.

7. The composite structure curing system as defined in claim 6 wherein each of the placed fibers are conductive and connect said plurality of temperature sensors to said control system.

8. The composite structure curing system as defined in claim 1 wherein the array of the plurality of heaters is dispersed in three dimensions.

9. The composite structure curing system as defined in claim 1 wherein the composite structure is non-uniform.

10. A method for controlling cure temperature of a composite structure comprising:
mounting a plurality of heaters in at least one array in spaced proximity to a composite structure to be cured;
applying heat from the plurality of heaters;
mounting a plurality of temperature sensors on the composite structure;
sensing applied heat at a plurality of locations with the plurality of temperature sensors wherein at least one of said plurality of temperature sensors id associated with each of a plurality of placed fibers to sense temperature of each placed fiber; and
controlling power to each of the plurality of heaters responsive to the plurality of temperature sensors with a control system receiving an input from each of the plurality of temperature sensors, said control system adapted to control each of the plurality of heaters responsive to each input to establish a predetermined temperature profile on the structure during cure.

11. A composite structure curing system comprising:
a plurality of heaters mounted in at least one array in spaced proximity to a composite structure to be cured;
a plurality of temperature sensors mounted to sense temperature at selected locations on the structure; and,
a control system receiving an input from each of the plurality of temperature sensors, said control system adapted to control each of the plurality of heaters responsive to each input to establish a predetermined temperature profile on the structure during cure, wherein the plurality of temperature sensors are mounted to sense surface temperature of the composite structure and the control system is further configured to convert surface temperature of each temperature sensor to an inner ply temperature and said predetermined temperature profile is established as an inner ply temperature profile.

12. The method for controlling cure temperature of a composite structure as defined in claim 10 further comprising:
placing the composite structure in a pressure chamber; and,
controlling the pressure in the chamber responsive to predetermined requirements for the composite structure.

13. The method for controlling cure temperature of a composite structure as defined in claim 12 wherein the pressure chamber incorporates a plurality of controllable pressure valves and the step of controlling pressure comprises controlling each of the plurality of controllable pressure valves responsive to a predetermined profile.

14. The method for controlling cure temperature of a composite structure as defined in claim 10 further comprising:
laying up the plurality of placed fibers in the composite structure;
and wherein the step of mounting a plurality of temperature sensors comprises
mounting each of the plurality of temperature sensors associated with one of the placed fibers.

15. The method for controlling cure temperature of a composite structure as defined in claim 14 wherein the plurality of placed fibers comprise shape memory alloy fibers and the step of mounting a plurality of temperature sensors further comprises connecting each of the temperature sensors to a controller through conductive elements in an associated shape memory alloy fiber.

16. The method for controlling cure temperature of a composite structure as defined in claim 15 wherein the plurality of temperature sensors sense a surface temperature and further comprising converting the temperature sensed by each of the plurality of temperature sensors to an inner ply temperature.

17. The method for controlling cure temperature of a composite structure as defined in claim 14 wherein the step of controlling power comprises:
determining a temperature reading from each of the plurality of temperature sensors;
determining if a temperature threshold is being maintained for each of the plurality of temperature sensors; and,
increasing power to a heater associated with each of the plurality of temperature sensors for which the temperature threshold has not been maintained.

18. The method for controlling cure temperature of a composite structure as defined in claim 17 wherein the step of controlling power further comprises:
initiating temperature ramp up for cure;
determining a temperature reading from each of the plurality of temperature sensors;
determining if a temperature threshold has been reached for each of the plurality of temperature sensors; and,
maintaining power to the heater associated with each of the plurality of temperature sensors for which the temperature threshold has not been reached.

19. The method for controlling cure temperature of a composite structure as defined in claim 18 wherein the step of controlling power further comprises:
determining if a dwell time has been reached and, if so, initiating temperature ramp down;
determining a temperature reading from each of the plurality of temperature sensors;
determining if a temperature decrease rate has been reached for each of the plurality of temperature sensors; and,
decreasing power to the heater associated with each of the plurality of temperature sensors for which the temperature decrease rate has not been reached.

20. The method for controlling cure temperature of a composite structure as defined in claim 19 further comprising:
determining if a temperature cutoff has been reached for each of the plurality of temperature sensors and, if so, turning off power to the heater associated with each of the plurality of temperature sensors for which the temperature cutoff has been reached.

21. The method for controlling cure temperature of a composite structure as defined in claim 10 wherein the composite structure is non-uniform.

* * * * *